US006537015B2

(12) United States Patent
Lim et al.

(10) Patent No.: US 6,537,015 B2
(45) Date of Patent: Mar. 25, 2003

(54) CONTAINER LOADING AND UNLOADING APPARATUS

(75) Inventors: Dae-Woo Lim, Jeollabuk-do (KR); Yang-Man Byun, Jeollabuk-do (KR)

(73) Assignee: Kosman Co., Ltd., Jeollabuk-do (KR)

( * ) Notice: Subject to any disclaimer, the term of this patent is extended or adjusted under 35 U.S.C. 154(b) by 0 days.

(21) Appl. No.: 09/899,451

(22) Filed: Jul. 5, 2001

(65) Prior Publication Data

US 2002/0003996 A1 Jan. 10, 2002

(30) Foreign Application Priority Data

Jul. 29, 2000 (KR) ............................................. 00-43950
Jul. 7, 2000 (KR) ............................................. 00-38868

(51) Int. Cl.⁷ .................................................. B60P 1/64
(52) U.S. Cl. .......................................... 414/498; 410/80
(58) Field of Search ................................ 414/495, 498; 410/80, 81; 212/302

(56) References Cited

U.S. PATENT DOCUMENTS

| 2,925,930 | A | * | 2/1960 | Parks | 414/498 |
| 2,934,373 | A | * | 4/1960 | Doty, Jr. | 414/498 |
| 3,063,667 | A | * | 11/1962 | Doty, Jr. et al. | 414/498 |
| 3,315,942 | A | * | 4/1967 | Buberniak | 414/498 |
| 3,773,199 | A | * | 11/1973 | Arvidsson | 254/45 |
| 3,788,683 | A | * | 1/1974 | Rumell | 280/43.14 |
| 4,076,299 | A | * | 2/1978 | Dalton | 410/52 |
| 4,098,535 | A | * | 7/1978 | Berger | 280/763.1 |
| 5,624,225 | A | * | 4/1997 | Cox | 414/495 |
| 5,829,946 | A | * | 11/1998 | McNeilus et al. | 410/77 |

FOREIGN PATENT DOCUMENTS

| DE | 3622654 | * | 3/1987 | 414/498 |
| EP | 446388 | * | 9/1991 | 414/498 |

* cited by examiner

Primary Examiner—James W. Keenan
(74) Attorney, Agent, or Firm—Richard M. Goldberg

(57) ABSTRACT

A container loading and unloading apparatus including a container support frame at a base of a container main body and including a reception frame and a traverse frame; an inverted L-shaped container supporter in the traverse frame and including a horizontal adjustable supporter, a vertical supporter and a vertical adjustable supporter; covers formed at upper and lower ends of the vertical supporter and the vertical adjustable supporter, respectively; hanger fittings fixedly mounted in the covers for hanging a coil spring; a fixing device provided at a side surface of the traverse frame for fixing the container supporter; a reception groove formed on an outer side of the reception frame receiving the container supporter; elevation devices provided in a chassis of a freight car, each including a hydraulic cylinder operating in a vertically upward direction; and a guidance arrangement positioned corresponding to each elevation device.

5 Claims, 9 Drawing Sheets

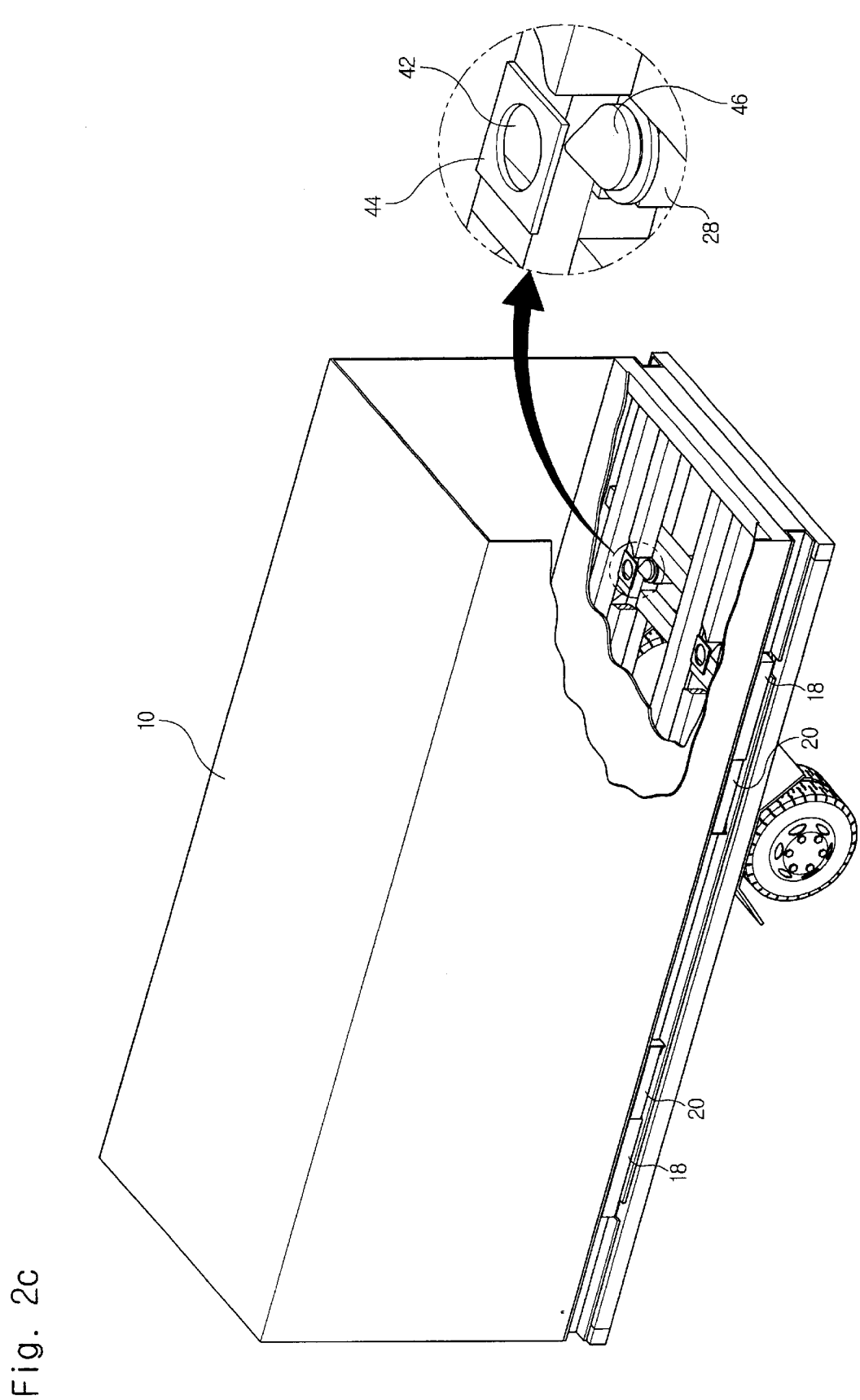

Fig. 7a
Fig. 7b
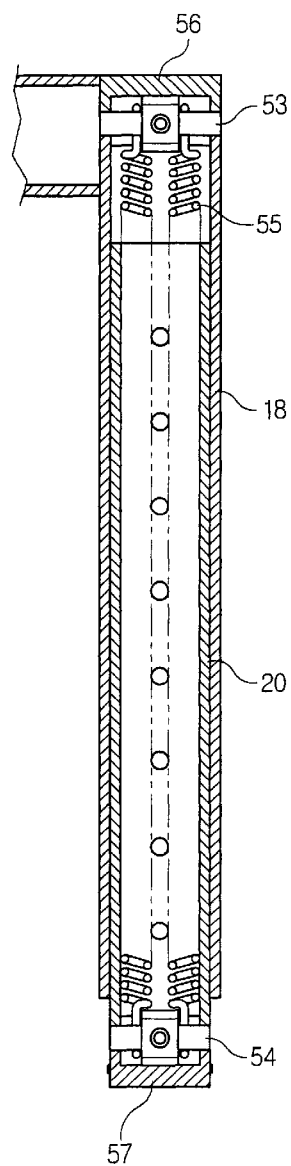
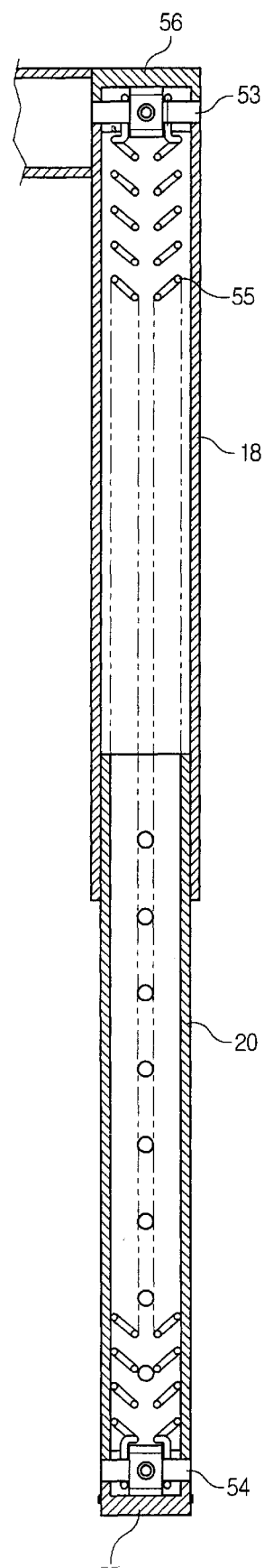

CONTAINER LOADING AND UNLOADING APPARATUS

BACKGROUND OF THE INVENTION

1. Field of the Invention

The present invention relates to a container loading and unloading apparatus, and more particularly to such an apparatus including a container supporter disposed on a lower side of the container, elevation means provided in a chassis of a freight car, and guidance means for compensating a container main body to be placed in position during a loading work.

2. Description of the Related Art

It is well known that a container for cargo transportation has a standardized cuboidal shape so as to be easily stacked up for land or marine transportation.

A forklift truck, a crane or the like is used for loading or unloading the container on or from a freight car in land, and the container itself serves as a handy warehouse of a kind when it is located on the ground.

Since the container is simply a cuboidal rigid body, however, it is inconvenient to necessarily mobilize the forklift truck, the crane or the like whenever the loading or unloading work is performed.

That is, the container is accompanied with frequent loading and unloading works from the viewpoint of its purpose, and one freight car repeatedly transports a plurality of containers while replacing one by another.

On all such occasions, equipments including the forklift truck, the crane or the like are inevitably needed for the container loading and unloading, thus causing a problem in requiring many equipments and labors to transport or store only one container.

SUMMARY OF THE INVENTION

Accordingly, the present invention has been made to overcome the above-mentioned problems, and it is an object of the present invention to provide a container having a loading and unloading apparatus which can facilitate a container loading or unloading work without a separate special equipment such as a forklift truck, a crane or the like.

To accomplish this object, there is provided a container loading and unloading apparatus in accordance with the present invention, the apparatus comprising:

a container support frame provided at a base of a container main body and consisting of a reception frame and a traverse frame;

an inverted L-shaped container supporter installed in the traverse frame and consisting of a horizontal adjustable supporter, a vertical supporter and a vertical adjustable supporter;

upper and lower covers formed at an upper end of the vertical supporter and a lower end of the vertical adjustable supporter, respectively;

upper and lower hanger fittings fixedly mounted in the upper and lower covers, respectively for hanging both ends of a pair of coil springs;

a fixing device provided at an end of a side surface of the traverse frame for fixing the container supporter;

a reception groove formed on an outer side of the reception frame for receiving the container supporter;

a plurality of elevation means provided in a chassis of a freight car, each elevation means constituted by a hydraulic cylinder operating in a vertically upward direction; and guidance means disposed in a position corresponding to that of the elevation means.

Preferably, the fixing device provided in the traverse frame comprises a support case, a fixing pin passing through the traverse frame by way of the support case, an operation pin forming a right angle to the fixing pin and integrated with the fixing pin, a handle joined with both ends of the operation pin, and an elastic repellent spring resiliently supported on the fixing pin.

It is preferred that the guidance means comprises an engagement fitting formed with a guide hole, and an upward sloping projection formed at an upper end of the hydraulic cylinder, the engagement fitting and the upward sloping projection being provided at the upper end of the elevation means and the base of the container main body in an opposite position to each other, respectively.

Alternatively, the guidance means may comprise a sloping groove formed at the upper end of the elevation means, and an engagement fitting provided at the base of the container main body and having a downward sloping projection in a position corresponding to that of the sloping groove.

The hydraulic cylinder as the elevation means is preferably provided in the chassis of the freight car in such a manner that it is positioned at a number of locations of the chassis, respectively and can be elevated in the vertically upward direction.

According to the so constructed container loading and unloading apparatus, the container loading or unloading work at the time of its transportation and storage can be easily performed without the separate equipment such as the forklift truck, the crane or the like, thereby cutting down equipments and labors. As the case may be, it is possible to stack up the containers as it does in the conventional container.

BRIEF DESCRIPTION OF THE DRAWINGS

The above objects, and other features and advantages of the present invention will become more apparent from the following detailed description in conjunction with the drawings, in which:

FIGS. 2a, 2b and 2c are perspective views schematically showing a container loading work using the container loading and unloading apparatus in accordance with the present invention, respectively;

FIGS. 7a and 7b are sectional views showing an operational state of the vertical adjustable supporter in accordance with the present invention, respectively;

DETAILED DESCRIPTION OF PREFERRED EMBODIMENTS

Figure 1A:
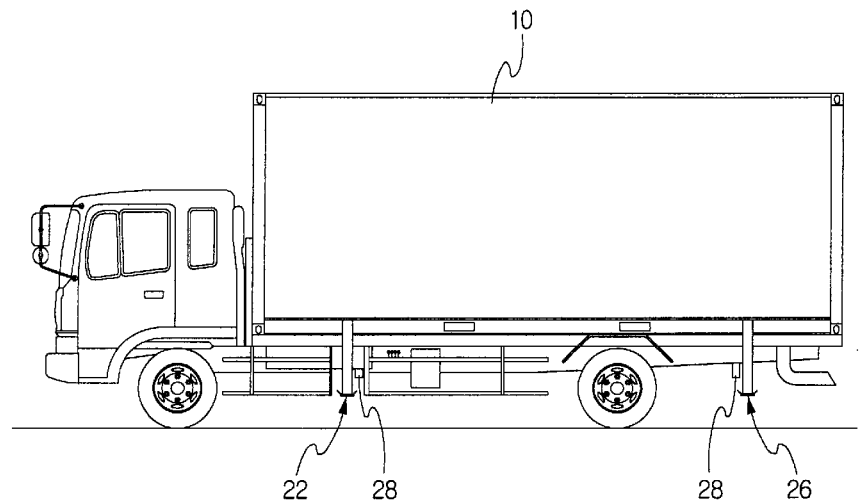
FIGS. 1a, 1b and 1c are side views schematically showing a container unloading work using a container loading and unloading apparatus in accordance with the present invention, respectively.
Figure 1B:
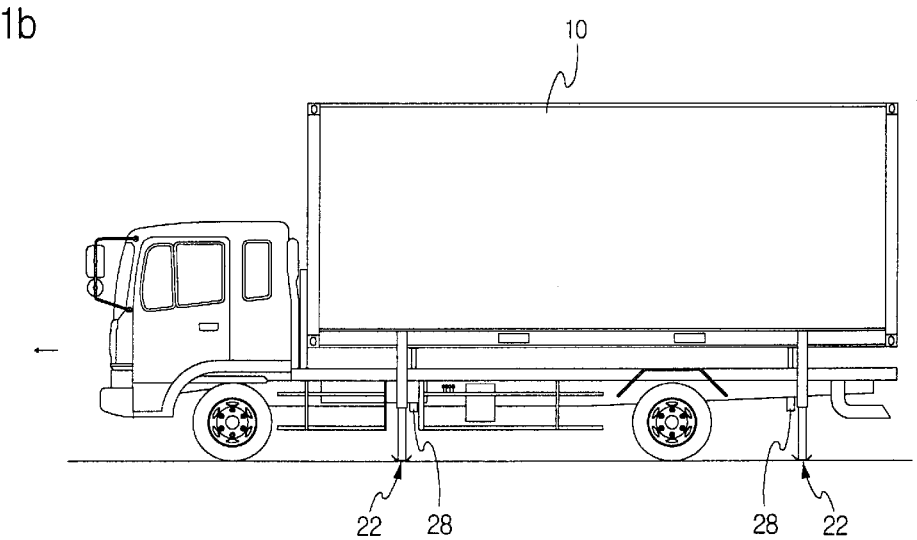
Figure 1C:
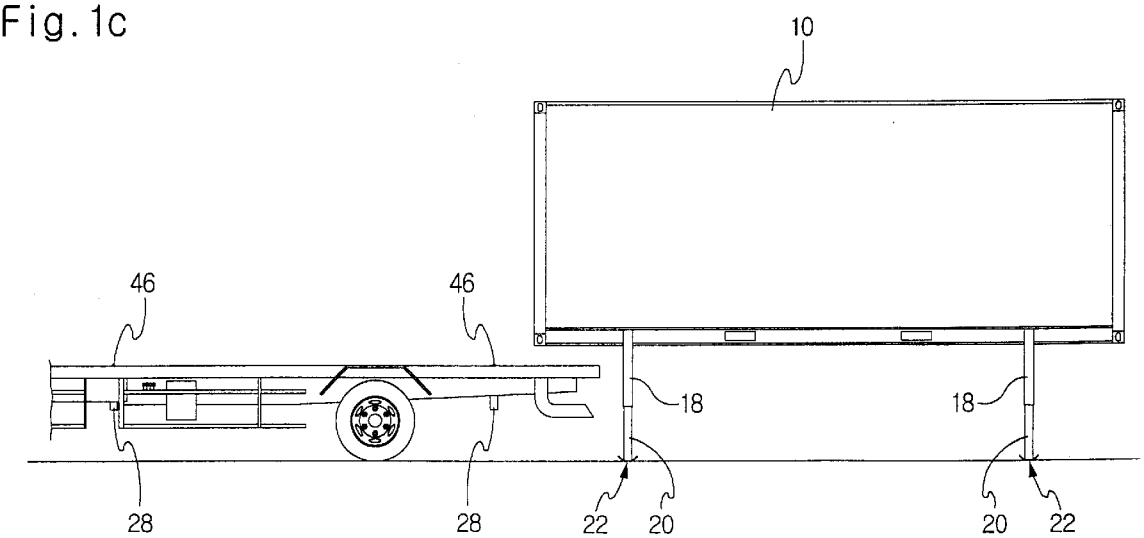
Figure 2A:
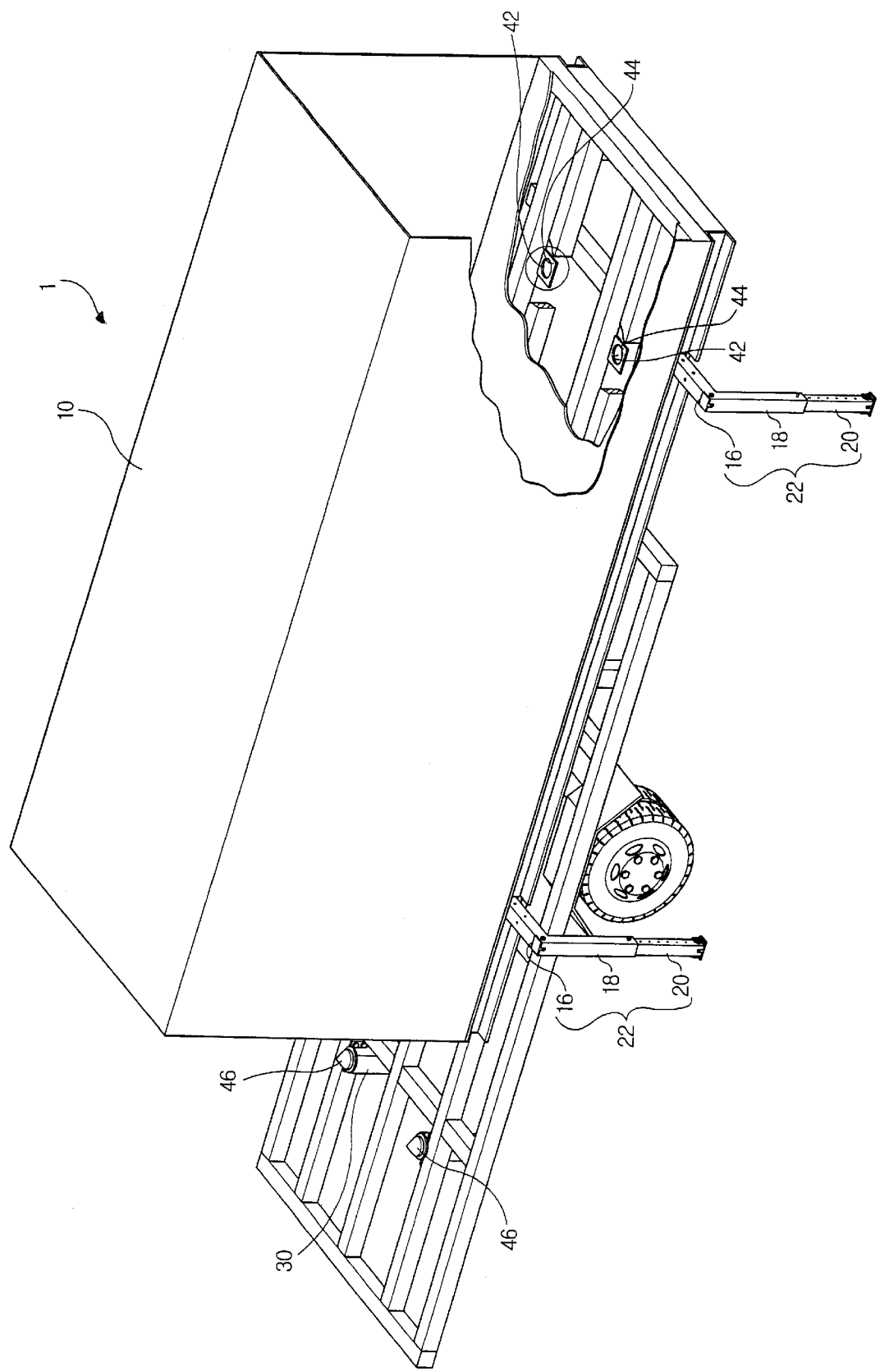
Figure 2B:
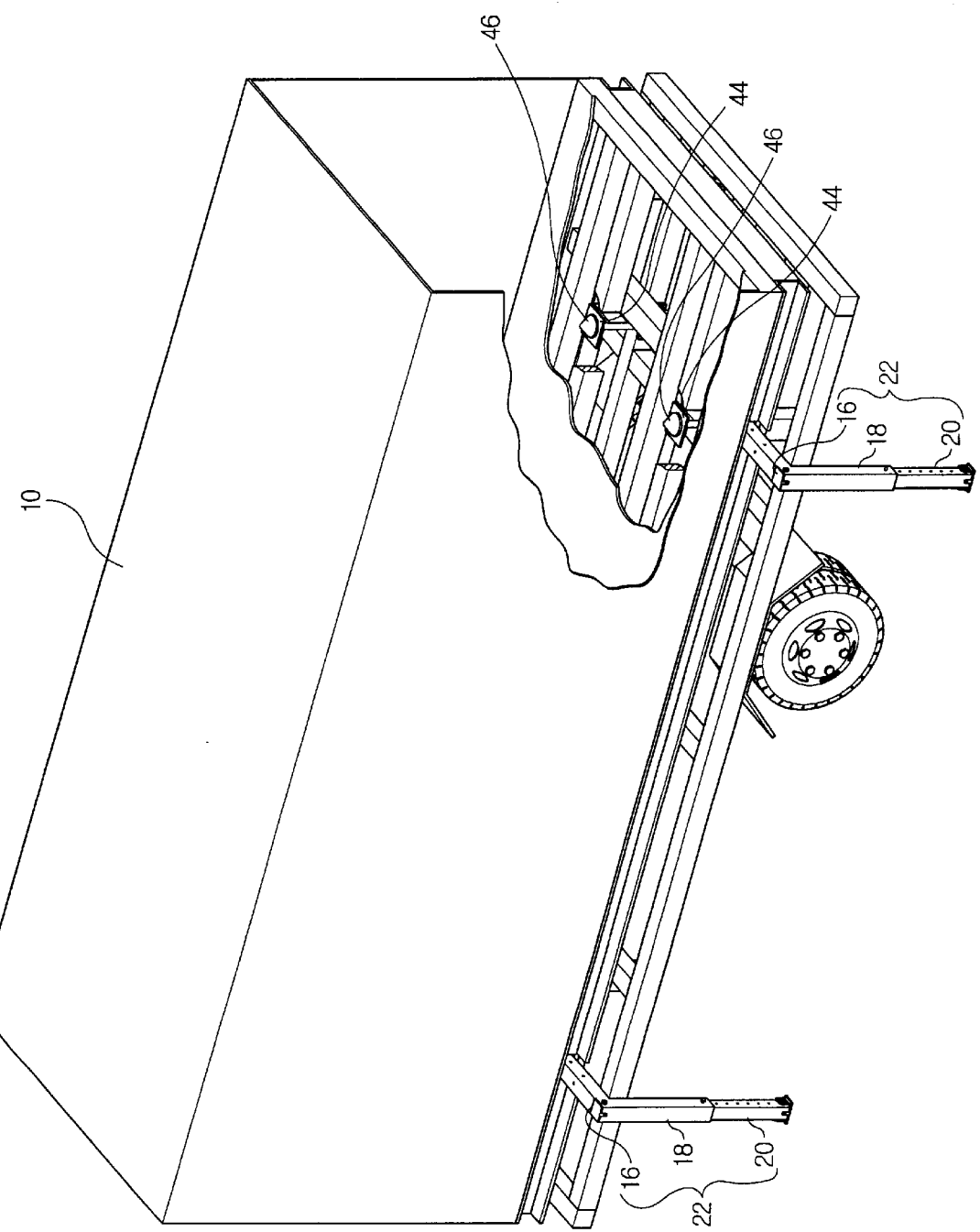
Figure 3:
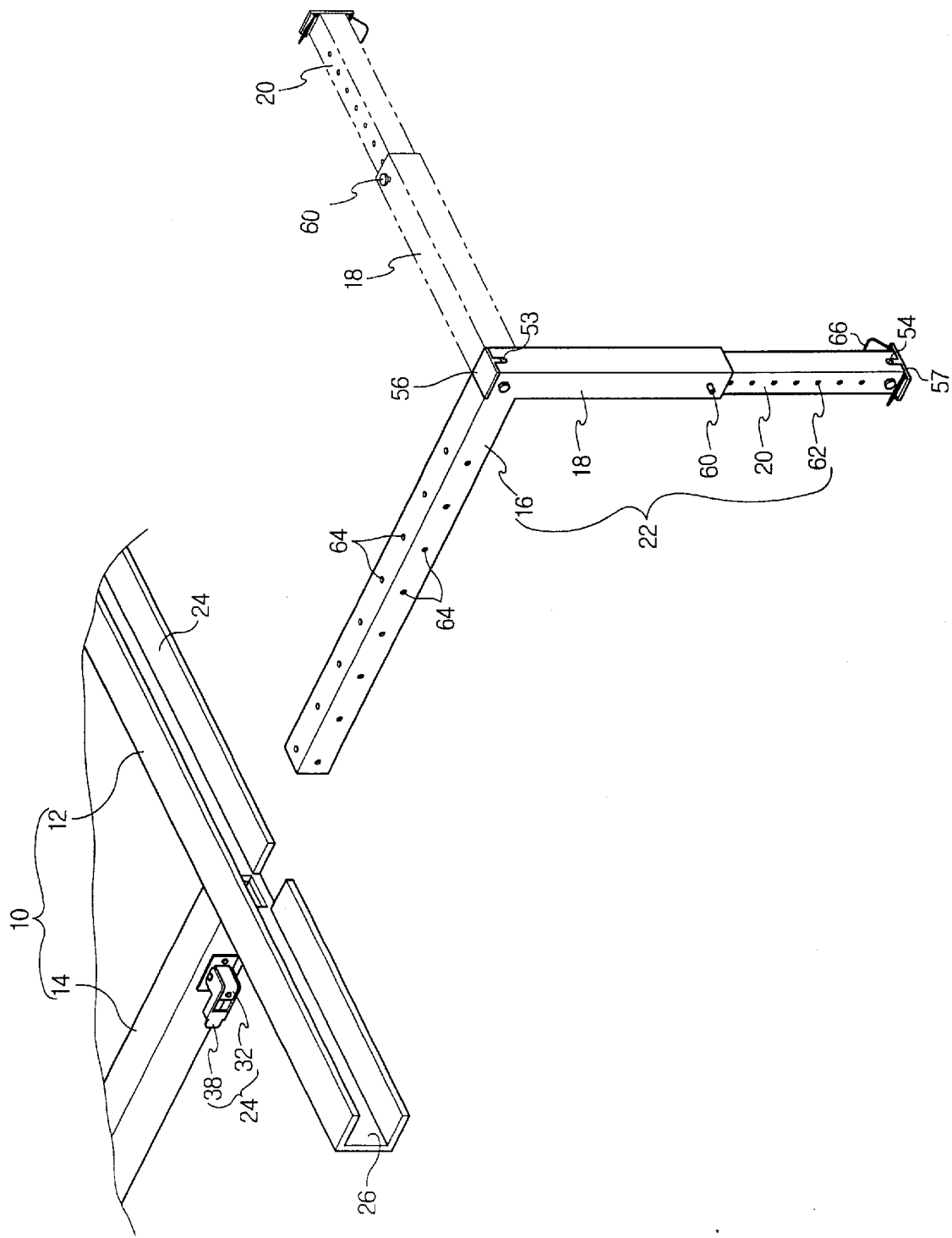
FIG. 3 is a perspective view showing a state that a container supporter as one main part of the container loading and unloading apparatus in accordance with the present invention is in use.
Figure 4:
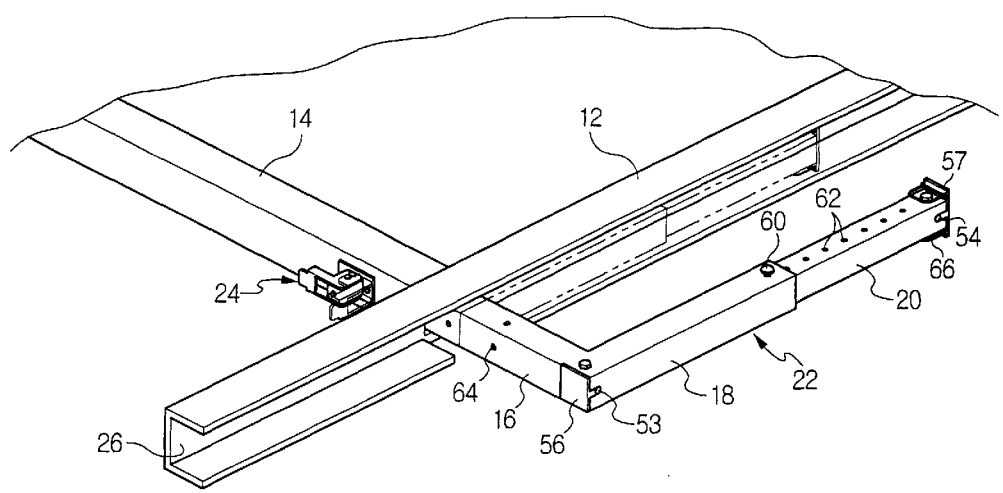
FIG. 4 is a perspective view showing a state that the container supporter as the main part of the container loading and unloading apparatus in accordance with the present invention is received in an outer side portion of a traverse frame.

Hereinafter, a preferred embodiment of a container loading and unloading apparatus in accordance with the present invention will be described with reference to the accompanying drawings.

The container loading and unloading apparatus of the present invention includes a container support frame 10 provided at a base of a container main body 1 and consisting of a reception frame 12 and a traverse frame 14. An inverted L-shaped container supporter 22 consisting of a horizontal adjustable supporter 16, a vertical supporter 18 and a vertical adjustable supporter 20 is installed in the traverse frame 14.

Upper and lower covers 56, 57 are formed at an upper end of the vertical supporter 18 and a lower end of the vertical adjustable supporter 20, respectively, and upper and lower hanger fittings 53, 54 are fixedly mounted in the upper and lower covers 56, 57, respectively so as to hang both ends of a pair of coil springs 55 thereon. A fixing device 24 for fixing the container supporter 22 is provided at an end of a side surface of the traverse frame 14. On an outer side of the reception frame 12, there is formed a reception groove 26 which can receive the container supporter 22 therein. A plurality of elevation means 28 are provided in a chassis of a freight car, each elevation means 28 being constituted by a hydraulic cylinder operating in a vertically upward direction. Guidance means 30 is disposed in a position corresponding to that of the elevation means 28 for the purpose of compensating the container main body 1 to be placed in position when it is loaded on the chassis of the freight car.

The fixing device 24 provided in the traverse frame 14 includes a support case 32, a fixing pin 34 passing through the traverse frame 14 by way of the support case 32, an operating pin 36 forming a right angle to the fixing pin 34 and integrated with the fixing pin 34, a handle 38 joined with both ends of the operation pin 36, and an elastic repellent spring 40 resiliently supported on the fixing pin 34.

The guidance means 30 comprises an engagement fitting 44 formed with a guide hole 42, and an upward sloping projection 46 formed at an upper end of the hydraulic cylinder. The engagement fitting 44 and the upward sloping projection 46 are provided at the upper end of the elevation means 28 and the base of the container main body 1 in an opposite position to each other, respectively.

Alternatively, the guidance means 30 may comprise a sloping groove 48 formed at the upper end of the elevation means 28, and an engagement fitting 52 provided at the base of the container main body 1 and having a downward sloping projection 50 in a position corresponding to that of the sloping groove 48.

Of non-explained reference numerals in the drawings, reference numeral "60" designates a pin for fixing the vertical 20 adjustable support 20, reference numeral "62" designates equally-spaced fixing holes formed in the vertical adjustable supporter 20, reference numeral "64" designates equally-spaced adjustable fixing holes formed in the horizontal adjustable supporter 16 and into which the fixing pin 34 is inserted, and reference numeral "66" designates a handle formed in the lower cover 57 which is provided at the lower end of the vertical adjustable supporter 20.

As shown in FIGS. 1a to 1c and FIGS. 2a to 2c, the container loading and unloading apparatus of the present invention as stated above makes it possible to perform the loading and unloading works of the container main body 1 without a special equipment such as a forklift truck, a crane or the like.

In order to perform the loading and unloading of the container main body 1, the container loading and unloading apparatus of the present invention includes the container support frame 10 provided at the base of the container main body 1 for securing a space within which the chassis of the freight car can be located as shown in FIGS. 3 to 7.

The container support frame 10 consists of the reception frame 12 provided at the base of the container main body 1 in a longitudinal direction of the container main body 1 and the traverse frame 14 formed integrally with the reception frame 12 in a direction intersecting the reception frame 12, and the inverted L-shaped container supporter 22 is inserted through the reception frame 12 and into the traverse frame 14 and is assembled in the container support frame 10 so as to install the container support frame 10 on the ground.

The container supporter 22 is divided into the horizontal adjustable supporter 16 and the vertical supporter 18. The horizontal adjustable supporter 16 is inserted into the traverse frame 14, and the vertical adjustable supporter 20 is inserted into the vertical supporter 18 so that height of the container supporter 20 can be optionally changed.

That is, the vertical adjustable supporter 20 is fixed to the vertical supporter 18 by the pin 60, and the vertical adjustable supporter 20 to be fixed by the pin 60 is formed with a plurality of equally-spaced fixing holes 62, thus being able to optionally change the height of the container supporter 20 as occasion demands by inserting the pin 60 into the selected fixing hole 62.

If the pin 60 fixing the vertical adjustable supporter 20 to the vertical supporter 18 is removed in such a situation, the vertical adjustable supporter 20 descends downward due to its own weight, but descends only by a certain length because both ends of the pair of inner coil springs 55 are hung on the upper hanger fitting provided in the upper portion of the vertical supporter 18 and on the lower hanger fitting 54 provided in the lower portion of the vertical adjustable supporter 20, respectively. Consequently, a safety accident can be prevented.

Also, when an operator lifts the vertical adjustable supporter 20 while grasping the handle 66 provided at the lower end of the vertical adjustable supporter 20 in order to reduce the length of the vertical adjustable supporter 20, the vertical adjustable supporter 20 can be lifted with a small force because a tensile force of the pair of inner coil springs 55 lessens the own weight of the vertical adjustable supporter 20.

The length of the coil springs is preferably equal to or longer than the length of the vertical supporter 18 and the vertical adjustable supporter 20 in a state that the vertical adjustable supporter 20 is completely inserted into the vertical supporter 18.

Also, the horizontal adjustable supporter 16 of the container supporter 22 is inserted into and integrally fixed to the traverse frame 14 as is needed, and is formed with a plurality of equally-spaced adjustable fixing holes 64 so as to be able to adjust width of the container supporter 22 and to provide smooth entrance and exit of the chassis of the freight car as occasion demands.

The fixing device 24 comprising the support case 32, the fixing pin 34 and the operation pin 36 forming a right angle together and integrated with each other, the handle 38, and the elastic repellent spring 40 is provided on the side surface of the traverse frame 14. The fixing pin 34 passes through the traverse frame 14, the operation pin 36 is fixed to both side plates of the handle 38 to function as a hinge axis, and the elastic repellent spring 40 is resiliently supported on the fixing pin 34 to apply a moving force toward the traverse frame 14 to the fixing pin 34.

Figure 5A:
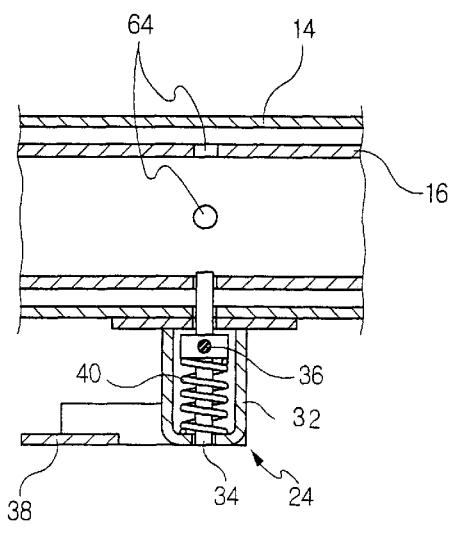
FIGS. 5a and 5b are sectional views of a fixing device for the container supporter as another main part of the container loading and unloading apparatus in accordance with the present invention, respectively.
Figure 5B:
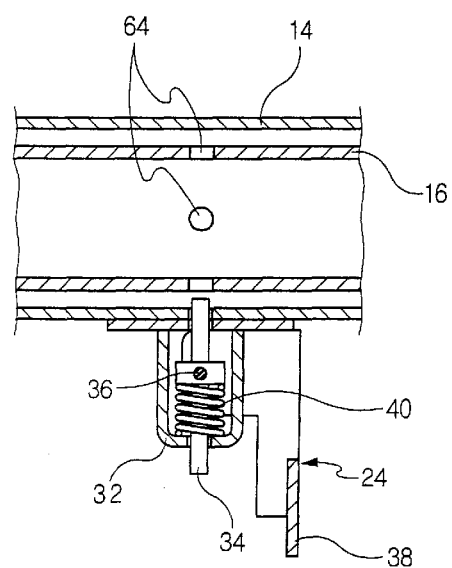

The operation pin 36 serves as the hinge axis of the handle 38 and the handle 38 serves as a lever. Both ends of the operation pin 36 are rotatably fixed to both side plates of the handle, but the fixed position is biased toward one side of the side plate, so that there is a difference in a distance from the fixed position to the traverse frame 14 between when the handle 38 forms a right angle to the traverse frame 14 and when the handle 38 is positioned horizontally to the traverse frame 14 as shown in FIGS. 5a and 5b. That is, the fixing pin 34 is pushed in the traverse frame 14 or is removed from the traverse frame 14 by this difference in the distance.

By operating the handle 38 of the fixing device 24, therefore, the container supporter 22 can be drawn out from the traverse frame 14 by a desired length, and can be separated from and then inserted again into the traverse frame 14 while being so positioned that the vertical support 18 is received in the reception groove 26 of the reception frame 12 as the case may be.

Figure 6:
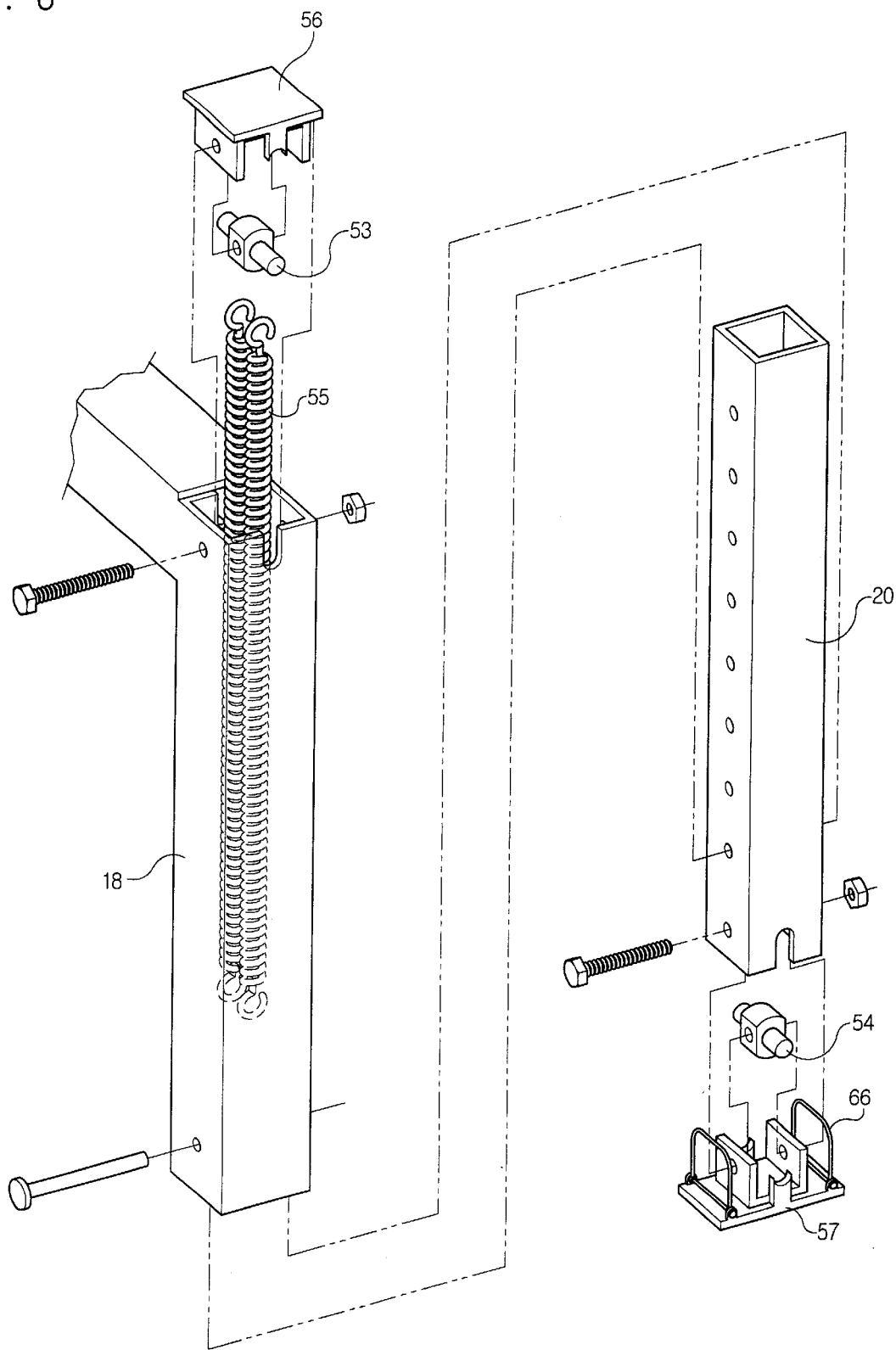
FIG. 6 is an exploded perspective view of a vertical supporter and a vertical adjustable supporter in accordance with the present invention.
Figure 8A:
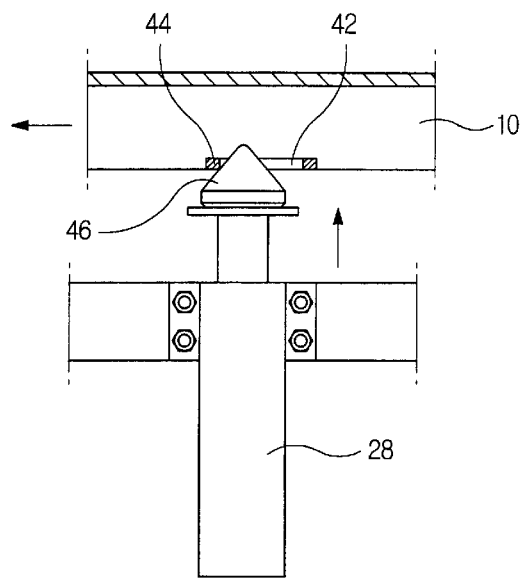
FIGS. 8a and 8b are partially sectional views showing an operational state of elevation means and guidance means as other main parts of the container loading and unloading apparatus in accordance with the present invention, respectively.
Figure 8B:
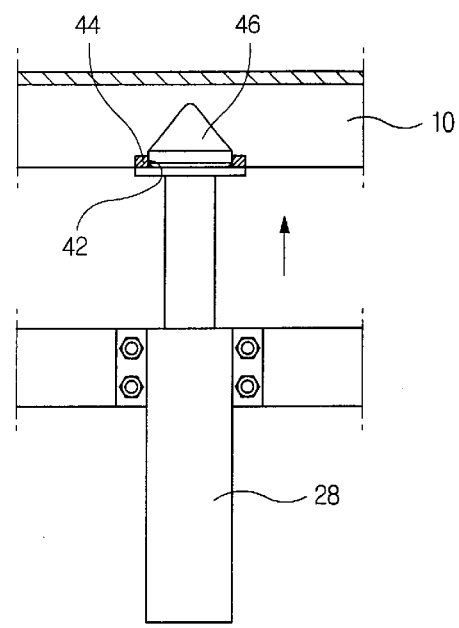

As shown in FIG. 6, the so constructed container main body 1 is lifted by the guidance means 30 and the elevation means 28 provided at the base of the container main body 1 and in the chassis of the freight car, respectively.

The guidance means 30 comprises the guide hole 42 and the sloping projection 46 whose center is coincided with each other when they are engaged with each other. The guide hole 42 is formed in the engagement fitting 44 attached to the base of the container main body 1, and the sloping projection 46 is formed at the upper end of the hydraulic cylinder constituting the elevation means 28.

The elevation means 28 is constituted by the hydraulic cylinder attached to the chassis and elevated in the vertically upward direction, and is generally provided separately from a hydraulic supporter attached to the chassis of a special vehicle, but only the hydraulic cylinder may be provided in order to lift the container main body 1 in some cases.

Although the guide hole 42 and the sloping projection 46 are depicted as the circular shape and the conical shape, respectively in the drawings, the guide hole 42 may be formed in another shape such as a shape of a triangle, a quadrangle, a pentagon, etc. and the sloping projection 46 may be formed in a shape of a triangular pyramid, a quadrangular pyramid, a pentagonal pyramid, etc. in accordance with the shape of the guide hole 42. Since the same working effects are achieved in case of these shapes, the guide hole 42 and the sloping projection 46 are not limited to the special shape, and the circular shape of the guide hole 42 and the conical shape of the sloping projection 46 are shown as only one of preferred shapes.

Since an axis passing through a center of a circle formed by the guide hole 42 and a center axis of the sloping projection 46 are the same axis, coincidence of the center and the center axis with each other indicates that the container main body 1 is loaded in a proper position, and a closed area within the guide hole 42 is a compensation range of the guidance means 30.

Now, a description will be given for the guidance action of the container main body 1 to the proper position using the guidance means 30.

When the sloping projection 46 ascends by elevating of the elevation means 28, a side surface, that is, a slope of the sloping projection 46 is interfered by contacting with an inner surface of the guide hole 42 if the center of the guide hole 42 and the center axis of the sloping projection 46 do not coincide with each other.

If the elevation means 30 is further elevated in such a situation, an external force of the elevation means 30 acts on the engagement fitting 44 formed-with the guide hole 42 due to the above-mentioned interference to move the engagement fitting 44 along the slope of the sloping projection 46 until the center of the guide hole 42 and the center axis of the sloping projection 46 are finally coincided with each other, which results in loading of the container main body 1 in the proper position on the chassis of the freight car.

At this time, it is preferred that the inner surface of the guide hole 42 forms the same slope as that of the sloping projection 46, diameters of the guide hole 42 and a base of the sloping projection 46 are experimentally determined so as to position the container main body 1 in the proper position, and the diameter of the base of the sloping projection 46 is larger than that of the guide hole 42.

Figure 9A:
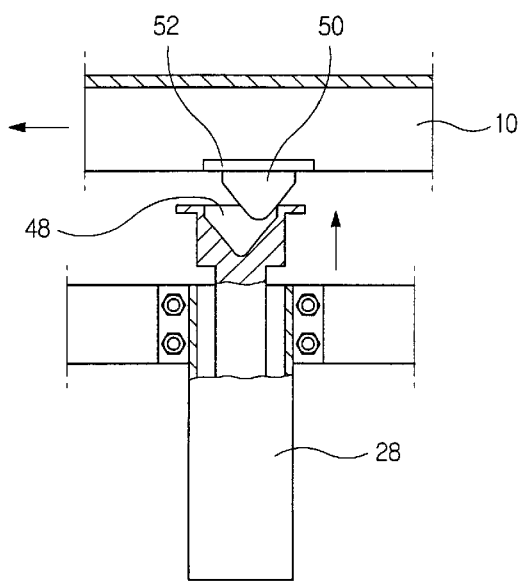
FIGS. 9a and 9b are partially sectional views illustrating another embodiment of the elevation means and the guidance means as the main parts of the container loading and unloading apparatus in accordance with the present invention.
Figure 9B:
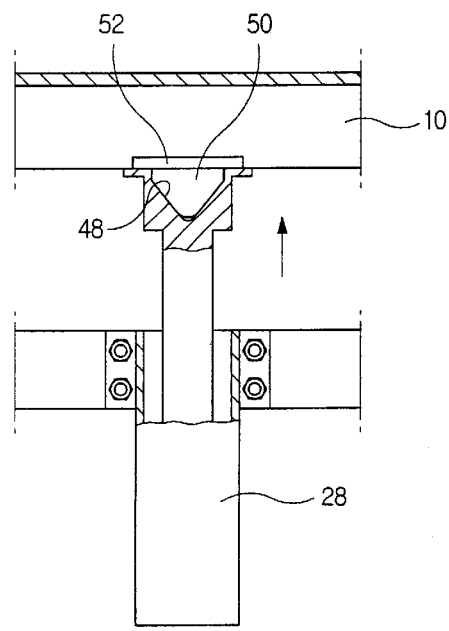

Such a guidance means 30 may comprise a sloping groove 48 formed at the upper end of the elevation means 28, and an engagement fitting 52 provided at the base of the container main body 1 and having a downward sloping projection 50 in a position corresponding to that of the sloping groove 48 as shown in FIGS. 9a and 9b. The guidance action of this case is the same as the above-mentioned guidance action and so its detailed description will be omitted.

As described above, the container loading and unloading apparatus of the present invention makes it possible to perform the loading and unloading works of the container main body 1 at the time of its storage and transportation without the separate loading and unloading equipment by providing the container supporter 22 to secure a space for loading the container main body 1 on the chassis of the freight car, thereby reducing equipments and labor as well as facilitating the loading and unloading works.

While the present invention has been illustrated and described under considering a preferred specific embodiment thereof, it will be easily understood by those skilled in the art that the present invention is not limited to the specific embodiment, and various changes, modifications and equivalents may be made without departing from the true scope of the present invention.

What is claimed is:

1. A container loading and unloading apparatus comprising:
    a container support frame provided at a base of a container main body and including a reception frame and a traverse frame;
    an inverted L-shaped container supporter installed in the traverse frame and including a horizontal adjustable supporter, a vertical supporter and a vertical adjustable supporter;
    upper and lower covers formed at an upper end of the vertical supporter and a lower end of the vertical adjustable supporter, respectively;

upper and lower hanger fittings fixedly mounted in the upper and lower covers, respectively for hanging both ends of a coil spring;

a fixing device provided at an end of a side surface of the traverse frame for fixing the container supporter;

a reception groove formed on an outer side of the reception frame for receiving the container supporter;

a plurality of elevation devices provided in a chassis of a freight car, each elevation device including a hydraulic cylinder operating in a vertically upward direction; and a guidance arrangement disposed in a position corresponding to that of at least one of said elevation devices.

2. A container loading and unloading apparatus according to claim 1, wherein the fixing device provided in the traverse frame comprises a support case, a fixing pin passing through the traverse frame by way of the support case, an operations pin forming a right angle to the fixing pin and integrated with the fixing pin, a handle joined with both ends of the operation pin, and an elastic repellent spring resiliently supported on the fixing pin.

3. A container loading and unloading apparatus according to claim 1, wherein the guidance arrangement comprises an engagement fitting formed with a guide hole, and an upward sloping projection formed at an upper end of the hydraulic cylinder, the engagement fitting and the upward sloping projection being provided at the upper end of the respective elevation device and the base of the container main body in an opposite position to each other, respectively.

4. A container loading and unloading apparatus according to claim 1, wherein the guidance arrangement comprises a sloping groove formed at an upper end of the respective elevation device, and an engagement fitting provided at the base of the container main body and having a downward sloping projection in a position corresponding to that of the sloping groove.

5. A container loading and unloading apparatus according to claim 1, wherein the hydraulic cylinder of each elevation device is provided in the chassis of the freight car in such a manner that it is positioned at a number of locations along the chassis, respectively and can be elevated in the vertically upward direction.

* * * * *